US012561679B2

(12) United States Patent
Aravamudhan et al.

(10) Patent No.: US 12,561,679 B2
(45) Date of Patent: Feb. 24, 2026

(54) SYSTEMS AND METHODS FOR PREFETCHING PAYMENT CARD INDUSTRY DATA

(71) Applicant: JPMORGAN CHASE BANK, N.A., New York, NY (US)

(72) Inventors: Sridhar Aravamudhan, Middletown, MD (US); Howard Spector, Street, MD (US); Valli Musti, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 68 days.

(21) Appl. No.: 18/585,901

(22) Filed: Feb. 23, 2024

(65) Prior Publication Data

US 2025/0182090 A1     Jun. 5, 2025

Related U.S. Application Data

(63) Continuation-in-part of application No. 18/527,074, filed on Dec. 1, 2023.

(51) Int. Cl.
*G06Q 20/38* (2012.01)
*G06F 21/62* (2013.01)
(Continued)

(52) U.S. Cl.
CPC ....... *G06Q 20/385* (2013.01); *G06F 21/6245* (2013.01); *G06F 21/6254* (2013.01);
(Continued)

(58) Field of Classification Search
CPC .............. G06Q 20/385; G06Q 20/367; G06Q 20/3827; G06Q 2220/00; G06Q 20/38215;
(Continued)

(56) References Cited

U.S. PATENT DOCUMENTS 8,595,850 B2 * 11/2013 Spies .................... H04L 9/0897
713/193
9,237,006 B2 * 1/2016 Mattsson .............. G06F 16/258
(Continued)

OTHER PUBLICATIONS

Liu et al. "State of the Art: Secure Mobile Payment", IEEE Access, vol. 8, 2020 (shown as published on Jan. 1, 2020 and date of current version Jan. 23, 2020, pp. 13898-13914) (Year: 2020).*

(Continued)

*Primary Examiner* — James D Nigh
(74) *Attorney, Agent, or Firm* — GREENBERG TRAURIG LLP

(57) ABSTRACT

Systems and methods for prefetching Payment Card Industry (PCI) data. A method may include a tokenization service in a cloud environment: (1) receiving a request to prefetch a plurality of tokens from a client application; (2) generating the plurality of tokens and a co-relation indicator for each of the plurality of tokens; (3) storing the plurality of tokens and the co-relation indicators in a token vault in the cloud environment; (4) returning the plurality of tokens and the co-relation indicators to the client electronic device; (5) receiving a mapping request comprising a source value and the co-relation indicator for one of the plurality of tokens; (6) identifying the token of the plurality of tokens associated with the co-relation indicator; (7) mapping the token to the source value; and (8) returning a message indicating successful mapping to the client application.

16 Claims, 7 Drawing Sheets

(51) Int. Cl.

| | |
|---|---|
| *G06Q 20/36* | (2012.01) |
| *H04L 9/06* | (2006.01) |
| *H04L 9/32* | (2006.01) |
| *H04L 67/10* | (2022.01) |

(52) U.S. Cl.
CPC ..... *G06Q 20/367* (2013.01); *G06Q 20/38215* (2013.01); *G06Q 20/3823* (2013.01); *G06Q 20/3827* (2013.01); *H04L 9/0643* (2013.01); *H04L 9/3213* (2013.01); *G06Q 2220/00* (2013.01); *H04L 67/10* (2013.01)

(58) Field of Classification Search
CPC ... G06Q 20/3823; H04L 67/10; H04L 9/0643; H04L 9/3213; G06F 21/6245; G06F 21/6254
USPC ........................................................ 705/65
See application file for complete search history.

(56) References Cited

U.S. PATENT DOCUMENTS

| | | | | |
|---|---|---|---|---|
| 10,025,941 | B1 * | 7/2018 | Griffin | G06F 21/6209 |
| 10,541,982 | B1 * | 1/2020 | Lee | G06F 40/211 |
| 2015/0127547 | A1 * | 5/2015 | Powell | G06Q 20/4016 |
| | | | | 705/67 |
| 2015/0312038 | A1 * | 10/2015 | Palanisamy | G06Q 20/385 |
| | | | | 713/155 |
| 2017/0098218 | A1 * | 4/2017 | Rios | G06Q 40/08 |
| 2018/0212956 | A1 * | 7/2018 | Sanganabhatla | H04L 63/0838 |
| 2018/0247654 | A1 * | 8/2018 | Bhaya | G06F 40/205 |
| 2024/0179003 | A1 * | 5/2024 | Bayon | H04L 9/0869 |
| 2024/0249270 | A1 * | 7/2024 | Sankaran | G06Q 20/385 |
| 2025/0030547 | A1 * | 1/2025 | Chowanski | H04L 9/3213 |

OTHER PUBLICATIONS

"Announcing Major Changes to the Issuer Identification Number (IIN) Standard", ANSI News and Publications, Jul. 28, 2016, 3 pages (Year: 2016).*

* cited by examiner

Client device provides token to tokenization service
(305)

Tokenization service constructs query
(310)

Tokenization service queries token table for encrypted source data
(315)

Tokenization service receives encrypted source data
(320)

Tokenization service decrypts encrypted source data
(325)

Tokenization service returns source data to client application
(330)

Computing Device 700

Memory(ies) 710

Processor(s) 705

Data Repository 720

Software Programs 715

730

Network Interface Connector 740

Wired Interface 742

Wireless Interface 744

SYSTEMS AND METHODS FOR PREFETCHING PAYMENT CARD INDUSTRY DATA

RELATED APPLICATIONS

This application is a Continuation-In-Part of U.S. patent application Ser. No. 18/527,074 filed Dec. 1, 2023, the disclosure of which is hereby incorporated, by reference, in its entirety.

BACKGROUND OF THE INVENTION

1. Field of the Invention

Embodiments relate to systems and methods for prefetching Payment Card Industry data.

2. Description of the Related Art

A system may use public cloud technology to deliver core critical business services to customers and stakeholders. In some cases, the system may need to distribute sensitive data across internal and/or external applications. Distributing sensitive data on the public cloud, however, increases the risk of inappropriate access/theft to that sensitive data.

SUMMARY OF THE INVENTION

Systems and methods for prefetching Payment Card Industry (PCI) data. In one embodiment, a method may include: (1) receiving, at a tokenization service executed in a cloud environment, a request to prefetch a plurality of tokens from a client application; (2) generating, by the tokenization service, the plurality of tokens and a co-relation indicator for each of the plurality of tokens; (3) storing, by the tokenization service, the plurality of tokens and the co-relation indicators in a token vault in the cloud environment; (4) returning, by the tokenization service, the plurality of tokens and the co-relation indicators to the client electronic device; (5) receiving, by the tokenization service, a mapping request comprising a source value and the co-relation indicator for one of the plurality of tokens; (6) identifying, by the tokenization service, the token of the plurality of tokens associated with the co-relation indicator; (7) mapping, by the tokenization service, the token to the source value; and (8) returning, by the tokenization service, a message indicating successful mapping to the client application.

In one embodiment, the request may include a token format for the one or more tokens.

In one embodiment, the token format comprises a token length.

In one embodiment, the method may also include: generating, by the tokenization service, a hash of the source value; encrypting, by the tokenization service, the source value; persisting, by the tokenization service, the hash and the token in a source hash table; and persisting, by the tokenization service, the hash, the encrypted source value, and the token in a token table.

In one embodiment, the source value may include sensitive data.

In one embodiment, the sensitive data may include personally identifiable data.

In one embodiment, the source value may include a primary account number.

According to another embodiment, a system may include: a client device executing a client application; and a cloud environment executing a tokenization service that may be configured to receive a request to prefetch a plurality of tokens from the client electronic device, to generate the one or more tokens and a co-relation indicator for each of the plurality of tokens to store the plurality of tokens and the co-relation indicators in a token vault in the cloud environment, to return the plurality of tokens and the co-relation indicators to the client electronic device, to receive a mapping request comprising a source value and the co-relation indicator for one of the plurality of tokens, to identify the token of the plurality of tokens associated with the co-relation indicator, to map the token to the source value, and to return a message indicating successful mapping to the client application.

In one embodiment, the request may include a token format for the one or more tokens.

In one embodiment, the token format may include a token length.

In one embodiment, the tokenization service may be further configured to generate a hash of the source value, to encrypt the source value, to persist the hash and the token in a source hash table, and to persist the hash, the encrypted source value, and the token in a token table.

In one embodiment, the source value may include sensitive data.

In one embodiment, the sensitive data may include personally identifiable data.

In one embodiment, the source value may include a primary account number.

According to another embodiment, a method may include: (1) receiving, at an account number generation service, a request to prefetch a plurality of primary account numbers from a client application; (2) generating, by the account number generation service, the plurality of primary account numbers; and (3) returning, by the account number generation service, the plurality of primary account numbers to the client electronic device. The client application may be configured to assign one of the plurality of account numbers to an account.

In one embodiment, the request may include a bank identification number for the plurality of primary account numbers.

In one embodiment, the client application may be configured to assign one of the plurality of account numbers to an account.

In one embodiment, the method may also include: receiving, by a tokenization service, a mapping request comprising one of the plurality of primary account numbers and a co-relation indicator for a token; identifying, by the tokenization service, the token out of a plurality of tokens associated with the co-relation indicator; mapping, by the tokenization service, the token to the primary account number; and returning, by the tokenization service, a message indicating successful mapping to the client application.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for tokenization in the public cloud.

Embodiments may be directed to pre-fetching tokens from a token vault so that the token vault is removed from the critical path during certain tasks, such as account opening. In addition, embodiments may also pre-generate primary account numbers (PANs) in order to expedite the tokenization process and to increase security. By not having to request PANs or tokenization in real-time, embodiments may avoid any latency involved in the communications with PAN generating systems and the token provider and may then comply with any service level agreements. Embodiments may further avoid any delays if the token provider is unavailable.

The tokens may be used to tokenize sensitive data (e.g., source data) before moving it onto the public cloud. For example, tokens, such as random tokens, may be used in place of the sensitive data, thereby providing useful information to external parties without exposing sensitive data. In embodiments, the tokens cannot be calculated back to their original values, thereby allowing for better protection of sensitive data.

Embodiments may generate tokens that may be idempotent within a logical boundary that represents a type of data. This logical boundary may be referred to as a "namespace." Each namespace may be protected using its own tokenization and de-tokenization entitlement, where permissions to a namespace may be managed by data owners. The use of namespaces provides for multitenancy.

In embodiments, the risk of data breaches or theft may be significantly reduced by using a token to protect sensitive data, such as credit card information.

Figure 1:
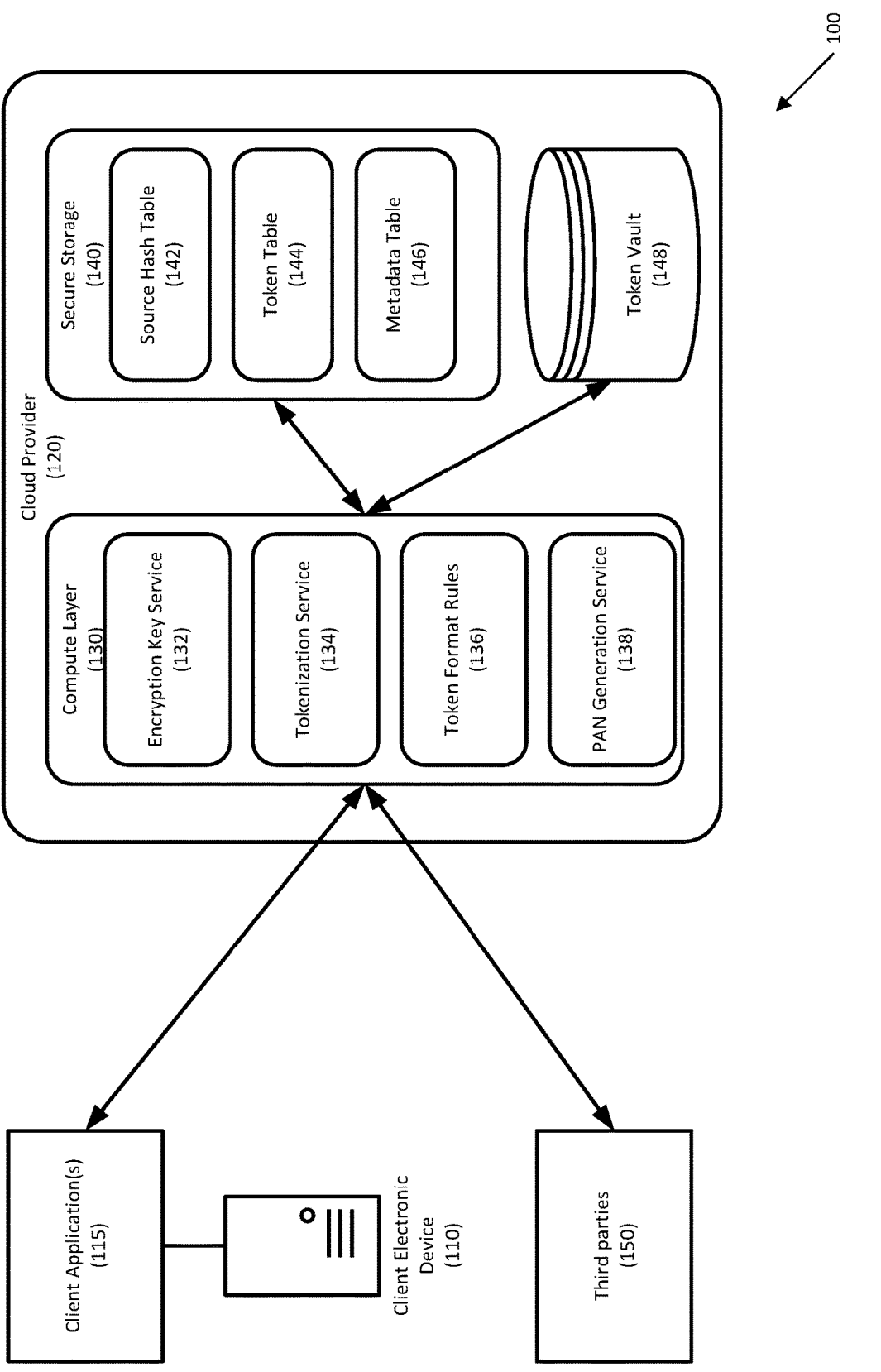
FIG. 1 illustrates a system for prefetching PCI data according to an embodiment.

Referring to FIG. 1, a system for prefetching PCI data is disclosed according to an embodiment. System 100 may include client electronic device 110, which may be a server (e.g., physical and/or cloud-based), a computer (e.g., a workstation, a desktop, a laptop, a notebook, a tablet, etc.), a smart device (e.g., a smart phone, a smart watch, etc.), an Internet of Things (IoT) appliance, etc. Client electronic device 110 may execute client application 115 that may be a computer program.

Client application may interface with cloud provider 120, which may provide a public cloud.

A plurality of client electronic devices 110 and/or client applications 115 may be provided. For example, one client application may provide source data for tokenizing, and another client application may use the token received from tokenization service 134 as a surrogate for the source data. Another client application may retrieve the source data that is associated with a token from tokenization service 134 as needed.

Cloud provider 120 may provide compute layer 130 and secure storage 140. Compute layer 130 may provide services, such as encryption key service 132 and tokenization service 134. Secure storage 140 may include source hash table 142, token table 144, and metadata table 146.

Tokenization service 134 may receive source data in namespaces from the client application. It may generate a token for the source data in each namespace, and may encrypt the data using keys obtained from encryption key service 132.

In one embodiment, the source data may be sensitive data, personal identifiable data, etc.

Tokenization service 134 may encrypt the source data according to an encryption scheme for the namespace.

Tokenization service 134 may also generate a hash (e.g., SHA-512) of the source data.

Tokenization service 134 may persist the hash of the source data in source hash table 142 of secure storage 140 with the token. In one embodiment, source hash table 142 may support look-up operations, such by using a hash of the source data.

In one embodiment, the hash and the token may be partitioned in source hash table 142 based on the application id and/or the namespace.

In one embodiment, the application id may identify client application 115 and/or a system of record (not shown) that owns the source data.

Tokenization service 134 may persist the encrypted source data, the hash, and the token in token table 144 of secure storage 140 with the token.

In one embodiment, the encrypted source data, the hash, and the token may be partitioned in token table 144 based on the application id and/or the namespace.

In one embodiment, the token may be formatted according to a set of token format rules 136. Token format rules 136 may specify, for example, the length of the token.

Metadata table 146 may store the format (e.g., token type) for each namespace, the token prefix, and/or an encryption master key identifier for each namespace. For incoming requests (e.g., a single item or multiple items), metadata table 146 may be used to perform authorization checks for each item in the request. For example, for each item in the request, embodiments may check that the record exists in metadata table 146 for the requested combination of the application identifier and namespace, and that a corresponding entitlement for this combination is provided in the authentication token received with the request.

In one embodiment, during token pre-fetching, tokenization service 134 may store the tokens and co-relation identifiers for those tokens in token vault 148. The co-relation indicators may later be used to associate a PAN with a token once assigned by, for example, client application 115.

One or more third parties 150 may receive and use the token instead of the actual data. In one embodiment, third parties 150 may provide the token to tokenization service 134 to retrieve the data associated with the token.

PAN generation service 138 may generate PANs for client application 115. Although PAN generation service 138 is depicted in compute layer of cloud provider 120, it should be noted that PAN generation service 138 may be provided in a separate cloud provider (not shown), in a system of record (not shown), on-premises, etc.

Figure 2:
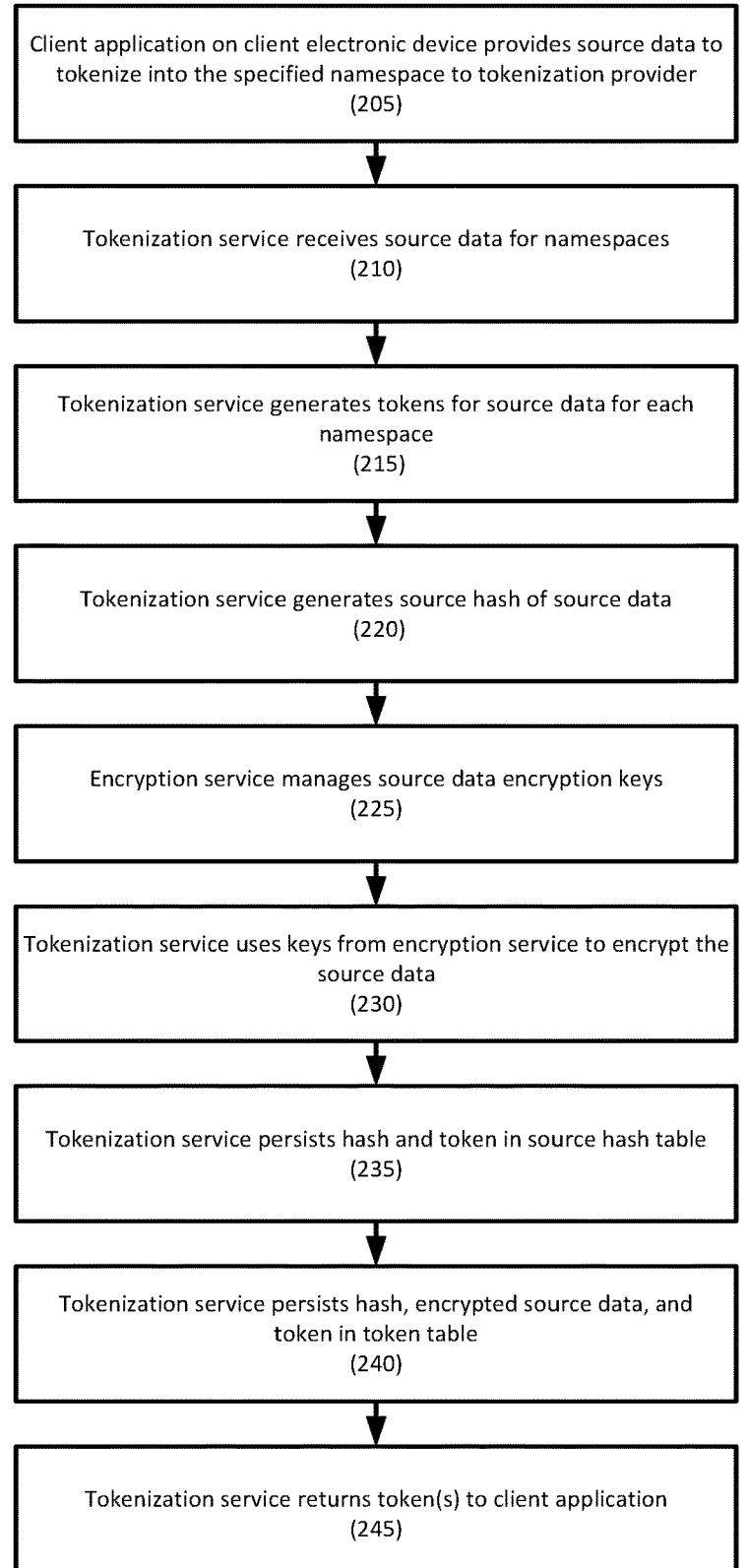
FIG. 2 illustrates a method for tokenizing data in the public cloud according to an embodiment.

Referring to FIG. 2, a method for tokenizing data in the public cloud according to an embodiment.

In step 205, a computer program, such as an client application executed by a client electronic device, may provide source data to tokenize into the specified namespace to a tokenization provider. For example, the source data may be provided in forms in an electronic document. As another example, the source data may be received from a database.

In one embodiment, the source data may be received via a REST API interface as part of the request body. The body may include the namespace under which the requested source data needs to be tokenized.

In one embodiment, the source data may include sensitive data, personal identifiable data, etc.

In step 210, a tokenization service in the cloud may receive the source data for a namespace. For example, one namespace type may hold addresses, another namespace type may hold email addresses, another namespace type may hold social security numbers, another namespace type may hold birthdates, etc. Each namespace may have different tokenization requirements, and the tokenization service may validate an entitlement or permission of the tokenization requester before proceeding.

In step 215, the tokenization service may generate a token for the source data. The token may be a random value, such as a Base64 encoded SecureRandom string. The length of the token for the namespace may be selected by the data owner. The token may have no relation to the original source data and cannot be calculated back to the source data.

The tokenization service may support numeric, alphanumeric, GUID, and Agnostic32 (e.g., independent of length of sensitive data the token will be always 32 char alpha numeric string) token types.

In one embodiment, each namespace may have a specific format for the token. Thus, a token for a date of birth may have a different format than a token for a credit card number. For example, the tokens may have different lengths, formats, etc. For example, a credit card may have a 16-digit numeric format for easier/faster adoption across the applications.

In step 220, the tokenization service may generate a hash of the source data. For example, the tokenization service may generate a SHA-512 hash of each source data value.

In step 225, an encryption key service in the compute layer may manage data encryption keys for encrypting the source data. In one embodiment, the source data may be encrypted with, for example, application level encryption. In another embodiment, each namespace may have its own encryption scheme.

In step 230, the tokenization service may use keys from encryption key service to encrypt the source data.

In step 235, the tokenization service may persist the hash and the token in, for example, a source hash table. The source hash table may be in secure cloud storage.

In one embodiment, an application identifier and an identifier of the system of record that owns the source data may be persisted with the token in the source hash table.

In one embodiment, the source hash table may be partitioned by namespace.

In step 240, the tokenization service may persist the hash, the encrypted source data, and the token, for example, a token table. The token table may be in secure cloud storage.

In one embodiment, an application identifier and an identifier of the system of record that owns the source data may be persisted with the token in the token table.

In one embodiment, the tokenization service may persist the format (e.g., token type) for each namespace, the token prefix, and/or an encryption master key identifier for each namespace in a metadata table.

In step 245, the tokenization computer program may return the token to the client application. The token may then be used as a surrogate for the actual value.

Figure 3:
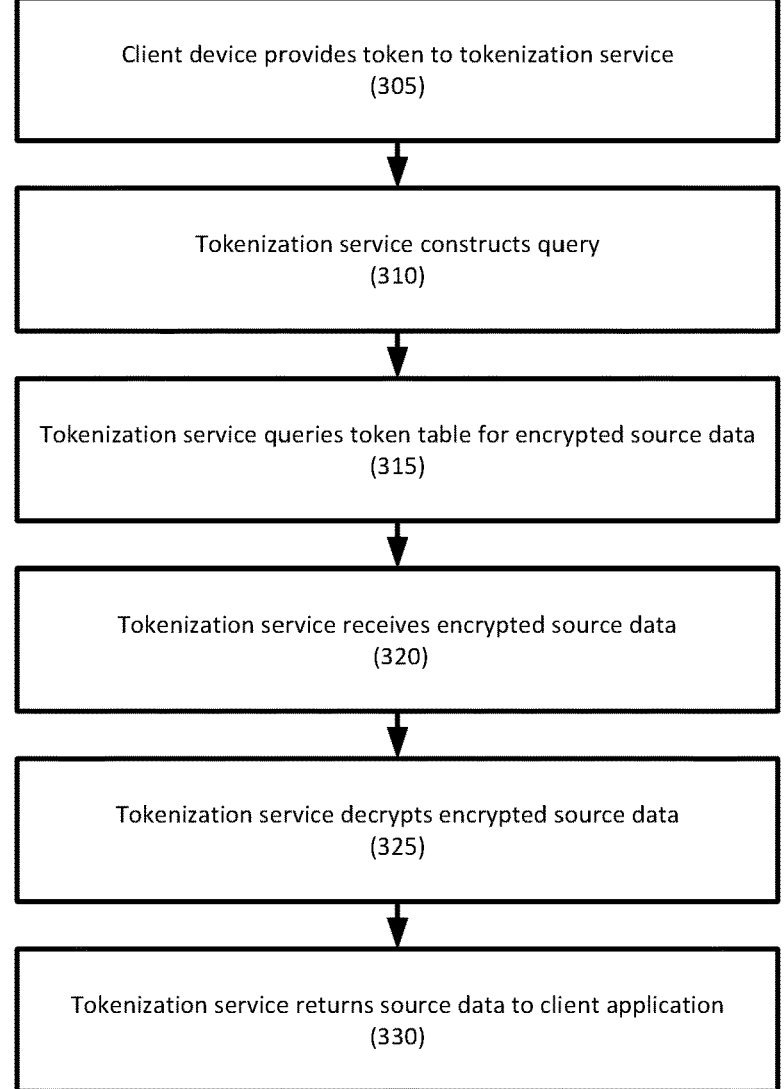
FIG. 3 illustrates a method for de-tokenizing data in the public cloud according to another embodiment.

Referring to FIG. 3, a method for de-tokenizing data in the public cloud is provided according to an embodiment.

In step 305, the client application may provide a token to a tokenization service in a compute layer of public cloud. In one embodiment, the client application may also provide the application identifier and the namespace.

In step 310, the tokenization service may construct a query using the token, the application identifier, and the namespace.

In step 315, the tokenization service may query the token table for the source data.

In one embodiment, the tokenization service may validate that the client requesting the decrypted data is entitled or permissioned to access the source data.

In one embodiment, the tokenization service may perform an authorization check for each item in the client request. For example, the tokenization service may check that a record exists in the metadata table for the requested combination of the application identifier and namespace, and that a corresponding entitlement for this combination is provided in the authentication token received with the request.

In step 320, the tokenization service may receive the encrypted source data as a result of the query.

In step 325, the tokenization service may decrypt the encrypted source data. The tokenization service may apply the same scheme that was used to encrypt the data to decrypt the source data.

In step 330, the tokenization service may return the source data to the client application.

Figure 4:
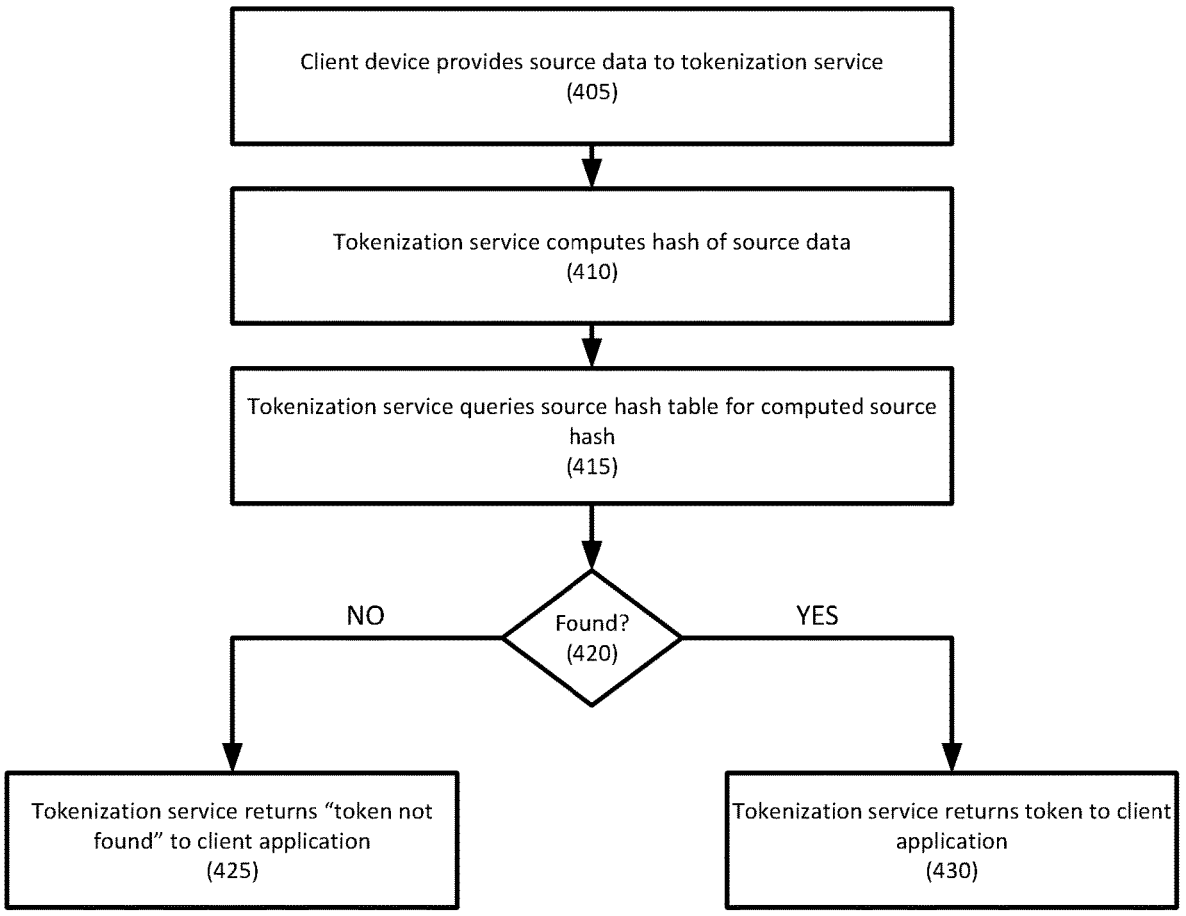
FIG. 4 depicts a method for token lookup in the public cloud according to an embodiment.

Referring to FIG. 4, a method for token lookup in the public cloud is provided according to an embodiment.

In step 405, the client application may provide the source data to a tokenization service in a compute layer of public cloud. In one embodiment, the client application may also provide an application identifier and the namespace.

In step 410, the tokenization service may compute a hash of the source data. In one embodiment, the tokenization service may hash the source data using the process for the namespace.

In one embodiment, the tokenization service may hash an application identifier if provided.

In step 415, the tokenization service may query the source hash table for the computed source hash.

In one embodiment, the tokenization service may validate that the client is entitled or permissioned to access the source data.

In one embodiment, the tokenization service may perform an authorization check for each item in the client request. For example, the tokenization service may check that a record exists in the metadata table for the requested combination of the application identifier and namespace, and that a corresponding entitlement for this combination is provided in the authentication token received with the request.

If, in step 420, the query returns no results, in step 425, the tokenization service may output a "token not found" response to the client application.

If, in step 420, the query returns a token, in step 430, the tokenization service may return the token to the client application. The token may then be used as a proxy for the source data.

Figure 5:
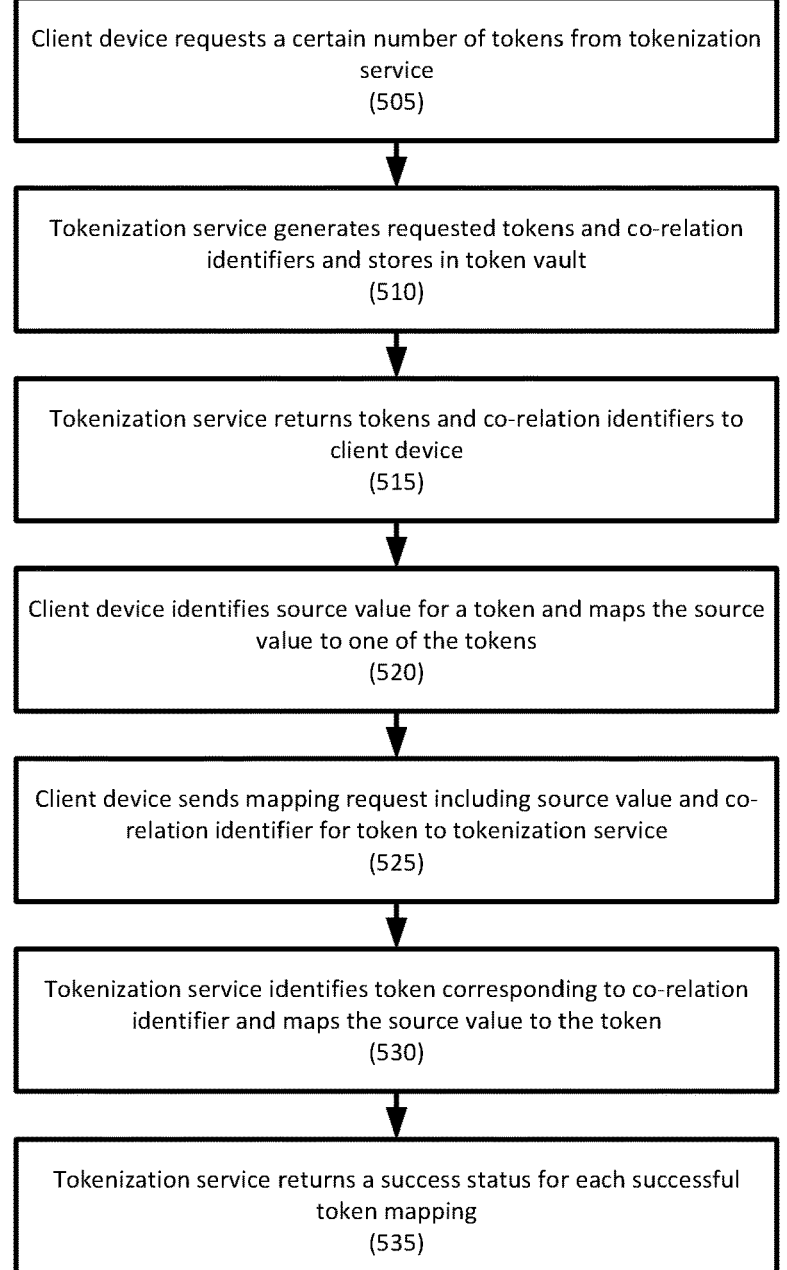
FIG. 5 depicts a method for token prefetching according to an embodiment.

FIG. 5 depicts a method for token prefetching according to an embodiment. Prefetching may be used when the tokenization service is unavailable so that a client may continue its operations by mapping the a source value to an unassigned, pre-fetched token. When the tokenization service is available, the client may send the source value the co-relation identifier to the tokenization system to update the mapping.

The co-relation indicator may be any value that is mapped to the token.

In embodiments, there may be a partial impact to the downstream systems of SOR (System of Record) in the way that they will not be able to de-tokenize the tokens that have not be yet updated by the tokenization service to reflect the mapping of the token to the source value.

Mapping may be done in a single synchronous call; prefetching, which involves the token creation may be performed in a separate call at different times.

Prefetching may include both prefetching tokens and mapping the tokens. In prefetching, a client electronic device may make a prefetch call (e.g., an API call) for one or more tokens for a certain token type. The call returns a list of tokens and each token's co-relation identifier. At this time, the tokens are not associated with a source value. For example, if de-tokenization request were sent for one of the tokens, the tokenization service will return a "Token not mapped" error.

The client electronic device may save the list of tokens and corresponding co-relation identifiers for later use.

When a client has a source value, the client may map or associate the source value with one of the unassigned tokens and may share the mapping with a downstream system. The client may then call the tokenization service with a map request to update the mapping between the token and the source value. The request may include the source value and the co-relation identifier, and the tokenization service may retrieve the token associated with the co-relation identifier and map the source value to the token.

In step 505, a client application executed by a client electronic device may request one or more tokens from tokenization service for future use. The tokens may be of one or more types. In one embodiment, the client application may execute an API call to request the tokens.

In one embodiment, the client application may also request certain formatting of the token digits. Examples of such formatting are disclosed in U.S. patent application Ser. No. 18/412,307, filed Jan. 12, 2024, the disclosure of which is hereby incorporated, by reference, in its entirety.

In step 510, the tokenization service may generate the requested tokens and co-relation identifiers for each of the tokens, and may store the tokens and the co-relation indicators in a token vault.

In step 515, the tokenization service may return the tokens and co-relation indicators to the client application.

In step 520, the client application may identify a source value for a token and may map the source value to one of the unassigned tokens.

In step 525, the client application may send a mapping request to map the source value to the token, including the mapped source value and a co-relation identifier for one of the tokens to the tokenization service. In one embodiment, the mapping request may also include the token. The mapping request may be sent in an API call.

In step 530, the tokenization service may identify to token corresponding to the co-relation identifier and may map the source value to the token. For example, the tokenization service may perform one or more of steps 220, 225, 230, 235, and 240.

In step 535, the tokenization service may return a successful status to the client application for each successful token mapping.

Figure 6:
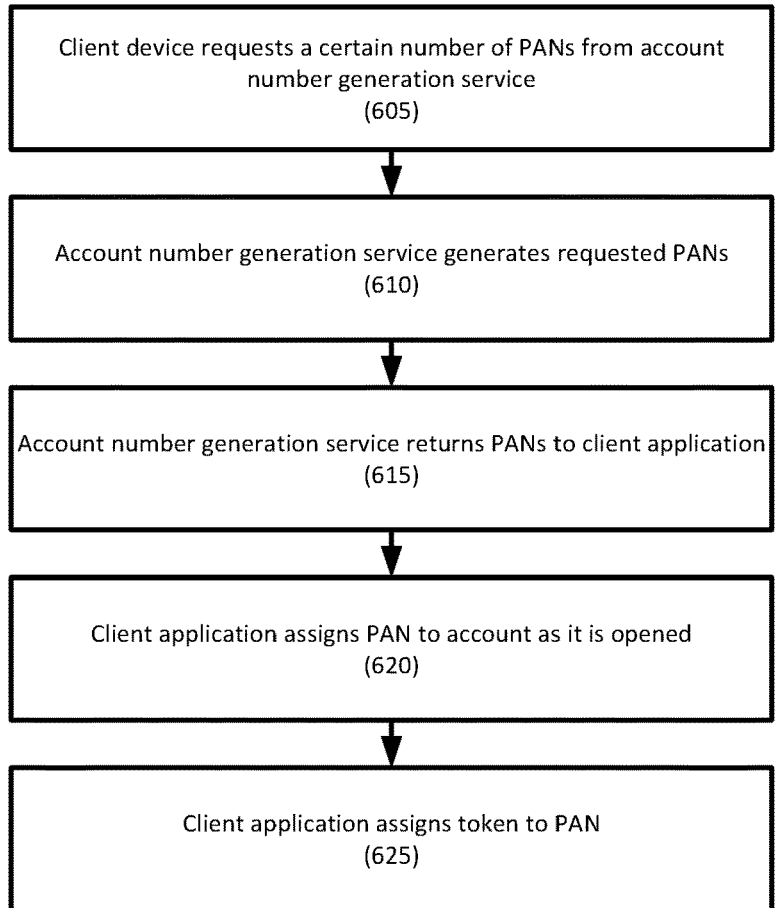
FIG. 6 depicts a method for prefetching primary account numbers according to an embodiment.

Referring to FIG. 6, a method for prefetching primary account numbers is disclosed according to an embodiment.

In step 605, a client application executed by a client electronic device may request a certain number of primary account numbers from an account number generation service, such as a credit card service. The client device may be associated with an account opening process for a financial institution.

In one embodiment, the client application may specify the bank identification number (BIN) for the PAN. In one embodiment, a first number of PANs with a first BIN may be requested, and a second number of PANs with a second BIN may be requested.

In step 610, the account number generation service may generate the requested PANs.

In step 615, the account number generation service may return the PANs to the client application.

In step 620, as part of the account opening process, the client application may assign one of the pre-fetched PANs to an account as it is opened.

In one embodiment, the client application may provide the PAN and any account information to a downstream system.

In step 625, if the client application has pre-fetched tokens, the client application may assign a pre-fetched token to the PAN. For example, the client application may assign a pre-fetched token and a co-relation identifier to the PAN, and may continue with the process of FIG. 5 at step 520.

Figure 7:
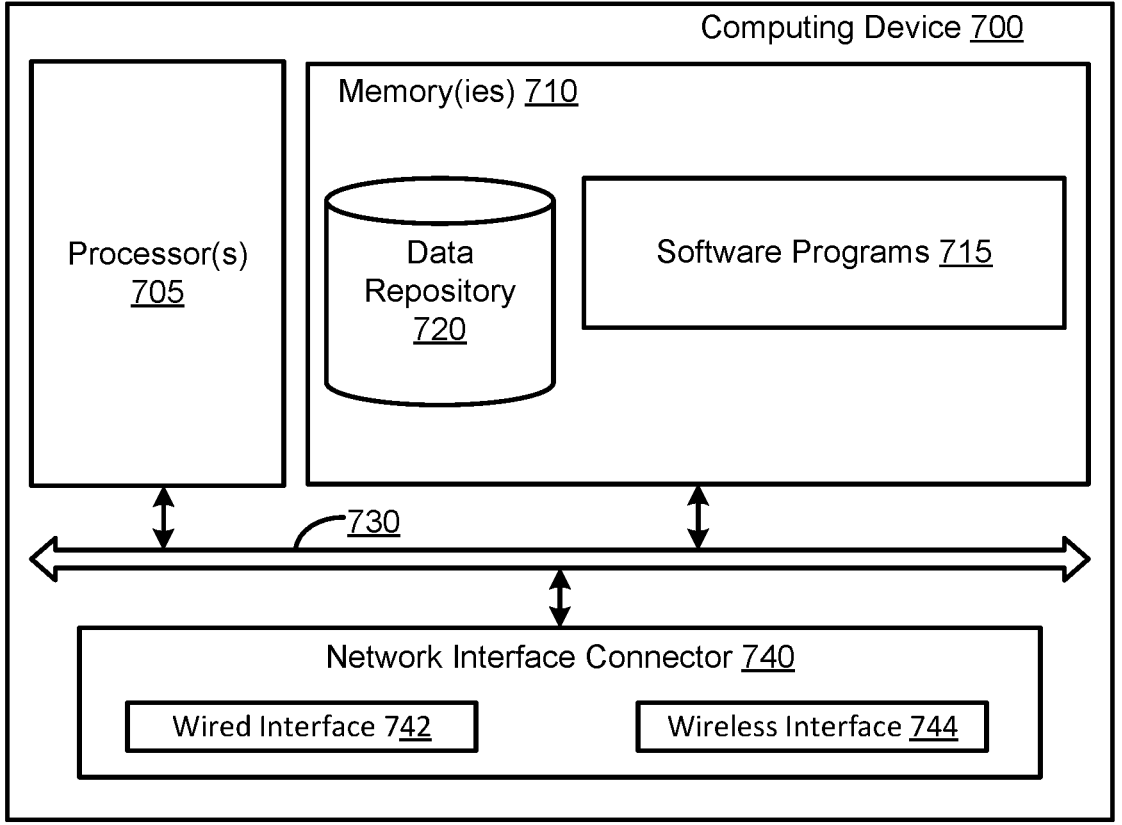
FIG. 7 depicts an exemplary computing system for implementing aspects of the present disclosure.

FIG. 7 depicts an exemplary computing system for implementing aspects of the present disclosure. FIG. 7 depicts exemplary computing device 700. Computing device 700 may represent the system components described herein. Computing device 700 may include processor 705 that may be coupled to memory 710. Memory 710 may include volatile memory. Processor 705 may execute computer-executable program code stored in memory 710, such as software programs 715. Software programs 715 may include one or more of the logical steps disclosed herein as a programmatic instruction, which may be executed by processor 705. Memory 710 may also include data repository 720, which may be nonvolatile memory for data persistence. Processor 705 and memory 710 may be coupled by bus 730. Bus 730 may also be coupled to one or more network interface connectors 740, such as wired network interface 742 or wireless network interface 744. Computing device 700 may also have user interface components, such as a screen for displaying graphical user interfaces and receiving input from the user, a mouse, a keyboard and/or other input/output components (not shown).

The disclosure of U.S. patent application Ser. No. 18/527,074, filed Dec. 1, 2023, is hereby incorporated, by reference, in its entirety.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
   receiving, at a tokenization service executed in a cloud environment, a request to prefetch a plurality of tokens from a client application executed by a client electronic device;

generating, by the tokenization service, the plurality of tokens and a co-relation indicator for each of the plurality of tokens;

storing, by the tokenization service, the plurality of tokens and the co-relation indicators in a token vault in the cloud environment;

returning, by the tokenization service, the plurality of tokens and the co-relation indicators to the client electronic device;

in response to the tokenization service being unavailable, mapping, by the client application, a source value to one token of the plurality of tokens;

using, by the client application, the token as a surrogate for the source value;

in response to the tokenization service being available again, sending, by the client application and to the tokenization service, a mapping request comprising the source value and the co-relation indicator for the token;

identifying, by the tokenization service, the token of the plurality of tokens associated with the co-relation indicator;

mapping, by the tokenization service, the token to the source value; and returning, by the tokenization service, a message indicating successful mapping to the client application.

2. The method of claim 1, wherein the request comprises a token format for the plurality of tokens.

3. The method of claim 2, wherein the token format comprises a token length.

4. The method of claim 1, further comprising:
   generating, by the tokenization service, a hash of the source value;

encrypting, by the tokenization service, the source value;

persisting, by the tokenization service, the hash and the token in a source hash table; and persisting, by the tokenization service, the hash, the encrypted source value, and the token in a token table.

5. The method of claim 1, wherein the source value comprises sensitive data.

6. The method of claim 5, wherein the sensitive data comprises personally identifiable data.

7. The method of claim 1, wherein the source value comprises a primary account number.

8. A system, comprising:
   a client electronic device executing a client application; and a cloud environment comprising a computer processor executing a tokenization service;

wherein:
      the tokenization service is configured to receive a request to prefetch a plurality of tokens from the client application;

the tokenization service is configured to generate the plurality of tokens and a co-relation indicator for each of the plurality of tokens to store the plurality of tokens and the co-relation indicators in a token vault in the cloud environment;

the tokenization service is configured to return the plurality of tokens and the co-relation indicators to the client application;

in response to the tokenization service being unavailable:
         the client application is configured to map a source value to one token of the plurality of tokens; and the client application is configured to use the token as a surrogate for the source value;

in response to the tokenization service being available again, sending, by the client application and to the tokenization service, a mapping request comprising the source value and the co-relation indicator for the token;

the tokenization service is configured to identify the token of the plurality of tokens associated with the co-relation indicator;

the tokenization service is configured to map the token to the source value; and the tokenization service is configured to return a message indicating successful mapping to the client application.

9. The system of claim 8, wherein the request comprises a token format for the plurality of tokens.

10. The system of claim 9, wherein the token format comprises a token length.

11. The system of claim 8, wherein:

the tokenization service is further configured to generate a hash of the source value;

the tokenization service is further configured to encrypt the source value;

the tokenization service is further configured to persist the hash and the token in a source hash table; and the tokenization service is further configured to persist the hash, the encrypted source value, and the token in a token table.

12. The system of claim 8, wherein the source value comprises sensitive data.

13. The system of claim 12, wherein the sensitive data comprises personally identifiable data.

14. The system of claim 8, wherein the source value comprises a primary account number.

15. A method, comprising:

receiving, at an account number generation service, a request to prefetch a plurality of primary account numbers from a client application executed by a client electronic device;

generating, by the account number generation service, the plurality of primary account numbers;

returning, by the account number generation service, the plurality of primary account numbers to the client application;

in response to the account number generation service being unavailable, assigning, by the client application, one of the plurality of account numbers to an account;

sending, by the client application and to a tokenization service, a mapping request comprising one of the plurality of primary account numbers and a co-relation indicator for a token;

identifying, by the tokenization service, the token out of a plurality of tokens associated with the co-relation indicator;

mapping, by the tokenization service, the token to the primary account number; and returning, by the tokenization service, a message indicating successful mapping to the client application.

16. The method of claim 15, wherein the request comprises a bank identification number for the plurality of primary account numbers.

* * * * *